United States Patent [19]

Claxton et al.

[11] 4,413,523
[45] Nov. 8, 1983

[54] SYSTEM FOR DAMPENING PULSATIONS OR OSCILLATIONS IN A FORCE-BALANCE INSTRUMENT

[75] Inventors: Kenneth W. Claxton; Lewis K. Harris, both of Tulsa, Okla.

[73] Assignee: Combustion Engineering, Inc., Windsor, Conn.

[21] Appl. No.: 371,084

[22] Filed: Apr. 23, 1982

[51] Int. Cl.³ .............................................. G01L 7/04
[52] U.S. Cl. ........................................ 73/701; 73/732
[58] Field of Search .......................... 73/701, 732–743

[56] References Cited

U.S. PATENT DOCUMENTS

| | | | |
|---|---|---|---|
| 2,451,425 | 10/1948 | Allwein | 73/701 |
| 2,980,835 | 4/1961 | Williams | 73/701 |
| 3,045,489 | 7/1962 | Brandt | 73/735 |
| 3,095,745 | 7/1963 | Kirwan | 73/736 |
| 3,150,526 | 9/1964 | Strimel | 73/732 |

*Primary Examiner*—Donald O. Woodiel
*Attorney, Agent, or Firm*—Arthur L. Wade

[57] ABSTRACT

A force-balance pressure measuring instrument incorporates a fluid pressure couple. The couple constructively includes a fulcrumed beam. The primary element is connected to the force-balance beam through a proportional band adjustment having a leaf spring which is changed in effective length. At certain settings of the leaf spring in the proportional band adjustment, oscillations, or pulsations, of the fulcrumed beam are generated. A compensation beam is pivoted on the fulcrumed beam to respond to the pulsations or oscillations of the fulcrumed beam and absorb energy to reduce pulsations or oscillations.

7 Claims, 4 Drawing Figures

SYSTEM FOR DAMPENING PULSATIONS OR OSCILLATIONS IN A FORCE-BALANCE INSTRUMENT

TECHNICAL FIELD

The present invention relates to compensating for the pulsations or oscillations in the movable portion of a fluid couple which is connected to a primary element through a proportional band adjustment. More particularly, the invention relates to eliminating pulsations or oscillations of the fulcrumed beam of a fluid pressure couple by mounting a compensating mechanism on the fulcrumed beam which will respond to the pulsations or oscillations.

BACKGROUND ART

Force-balance beam systems which are connected to primary measuring elements, commonly include a fluid pressure couple which produces a fluid pressure output within a range which is proportional to the position within a range of mechanical movement of the primary element. The linkage between the primary element and the fluid pressure couple may direct the forces which produce pulsations/oscillations in that member of the fluid pressure linked to the primary element.

The fluid pressure couple may be no more than a flapper connected to the primary element positioned over the discharge of a fluid pressure nozzle, the back pressures of the nozzle being representative of the positions of the primary element. The flapper may be represented as a fulcrumed beam and the nozzle may be replaced by a valve connected to the flapper. In all events, referring to a fluid pressure couple connected to a primary element, the essential structure is focused on the flapper-beam on which the forces are balanced about its fulcrum as it positions the fluid pressure valve to generate a range of fluid pressure outputs. It is common to arrange the system so that the fluid pressure outputs are over a range from 3 to 15 psi in response to the positions over the range of the primary element. The linkage between the primary element and the flapper-beam is commonly adjusted to determine what range of primary element position will produce the 3-15 psi output fluid pressures.

The adjustable linkage between the primary element and the flapper-beam is referred to as the proportional band adjustment. If the full movement of the primary element is linked to the flapper-beam to produce the 3-15 psi outputs, the proportional band is referred to as "high". If but a small range of primary element movement produces the 3-15 psi outputs, the proportional band is referred to as "low". The settings of the proportional band are designated in percentage. As an example, 100% of the primary element movement results in the full, 3-15 psi fluid pressure output. Thus, the proportional band is 100%. If 20% of the possible primary element movement results in the 3-15 psi output, the proportional band is designated as 20%.

There are settings, or adjustments, of the proportional band linkage which centralize forces on the flapper-beam element of the fluid pressure couple to cause it to oscillate. The natural frequency of the flapper-beam is reached by the proportional band adjustment and the result is a continuous, self-perpetuating pulsation, or vibration, or flutter, or oscillation of the flapper-beam which is, of course, unacceptable as representative of the primary element movement or position.

The general approach to eliminate the runaway flutter of the flapper-beam has been to provide friction. The force of friction applied to the beam will control the unstable pulsation, or vibration, or flutter, but at the cost of significant hysteresis. Obviously, it is desirable to control the unstable condition in these instruments without accepting hysteresis.

DISCLOSURE OF THE INVENTION

The present invention contemplates mounting an elongated compensating structure on the flapper-beam of a force-balance fluid pressure system with a pivot for the structure near the fulcrum of the flapper-beam and providing for engagement of the flapper-beam and the compensating structure when pulsations are initiated in the flapper-beam to thereby absorb from the flapper-beam the energy which is generating pulsation.

The invention further contemplates, the element of a fluid pressure couple which is connected to a primary element as a fulcrumed beam having a compensating beam pivoted on the fulcrumed flapper-beam in an arrangement whereby the compensating beam responds to the undesirable pulsations of the fulcrumed beam by making contact with this flapper-beam at a position spaced from the pivot of the compensation beam in order to absorb pulsation energy from the flapper-beam and thereby terminate its pulsations.

Other objects, advantages and features of this invention will become apparent to one skilled in the art upon consideration of the written specification, appended claims, and attached drawings.

BRIEF DESIGNATION OF THE DRAWINGS

BEST MODE FOR CARRYING OUT THE INVENTION

Terms and Technology

Figure 1:
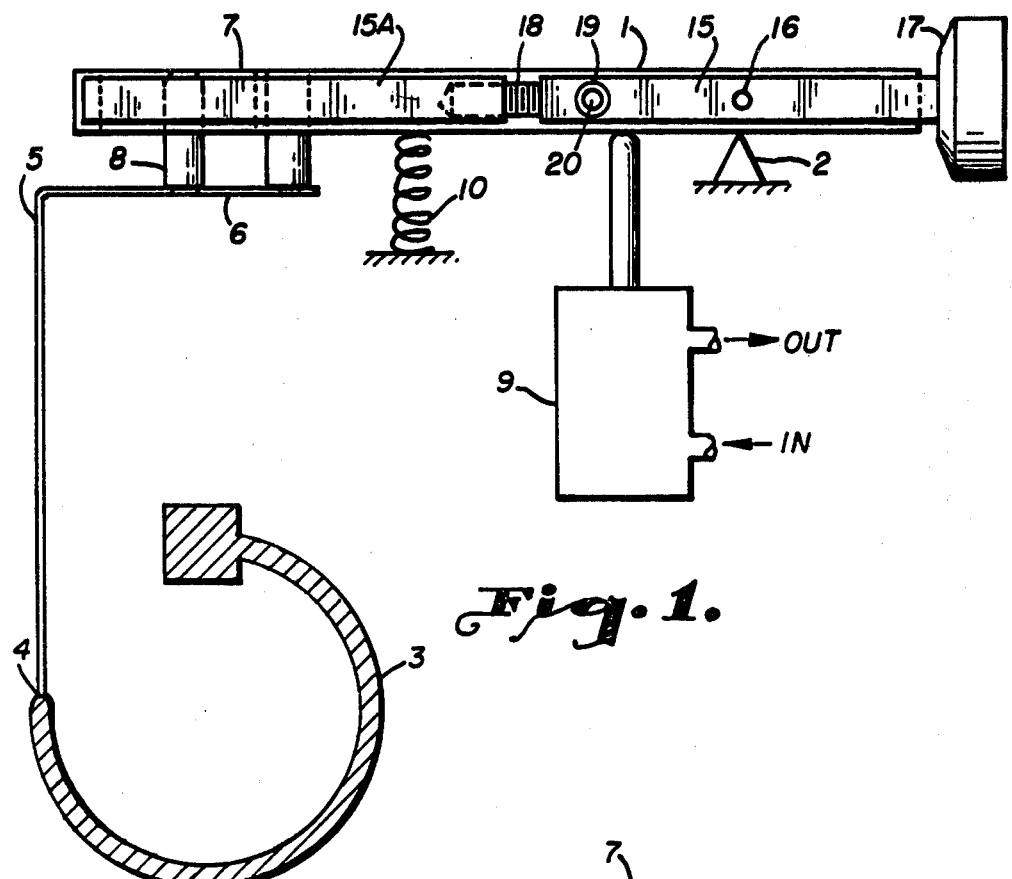
FIG. 1 is a somewhat diagrammatic elevation of a force-balance system responsive to pressure and embodying the present invention.

The fluid pressure couple, in its two basic elements, has been defined supra. Regardless of the form of the fluid pressure valve of the couple, it is actuated by a flapper which can be analyzed as having the form of a fulcrumed beam.

The flapper-beam will be referred to as fulcrumed for the purpose of distinguishing it from the compensation beam which will be referred to as pivoted on the fulcrumed flapper-beam. Forces applied to the flapper-beam are balanced around its fulcrum. As will be illustrated in this disclosure, a continuous force is applied to the flapper-beam, tending to rotate it clockwise about the fulcrum. The primary element will be linked to the flapper-beam to exert a force thereon which will tend to rotate the beam counter-clockwise in opposition to the continuous clockwise force. The continuous force is disclosed as originating with the spring of the pilot valve connected to the flapper-beam. The spring force is opposed by the primary element connected to the flapper-beam with the proportional band structure.

In the present disclosure, the proportional band adjustment is made in a linkage characterized by a leaf spring connecting the flapper-beam end to the primary element. Effective engagement between the spring and the beam is adjustable which, in turn, connects the primary element to the beam through the spring at various effective lengths of the spring. The proportional band adjustment is, therefore, made by positioning the effective connection between the spring element and the flapper-beam. It is at certain lengths of the spring of this connection that the problem appears. When the primary element exerts its force on the flapper-beam through a predetermined resilient length of the leaf spring, where the spring rate is below a critical value, energy input to the flapper-beam from any source, whether from the primary element, the pilot valve, or external vibrations, results in large excursions of the flapper-beam about its fulcrum before enough energy is transferred to the proportional band spring to decelerate and return it toward the position corresponding to the then attained position of the primary element. The flapper-beam is oscillating. These oscillations would stop as the energy is dissipated through the proportional band spring as heat, except during each cycle the pilot valve is contacted and adds energy to the system. Engineers working in differing disciplines might use differing, but equally valid, terms to describe the self-sustaining oscillations. Some of these terms are "equilibrium", "energy-balance", or "harmonic frequency". It is the energy of this oscillation which must be siphoned off, absorbed to break the cycle and regain stability. The problem can be approached from two directions: (1) change the frequency response of the system so that it requires a greater energy input than is available to sustain the oscillations, or (2) reduce the energy input, or even eliminate it long enough for the oscillations to cease.

If a scheme can be devised to reduce or interrupt the input energy during oscillation, the method will be slow because the system energy must be converted to heat and dissipated through the proportional band leaf spring which connects the flapper-beam to the primary element. Changing the frequency response of the flapper-beam can result in such massive construction as to border on the impractical. Nevertheless, it offers a method for rapid dampening of oscillation. The invention disclosed here attacks the problem from both directions by adding a second pivoted beam with approximately the same frequency response, and approximately the same mass moment of inertia as the flapper-beam and arranged so that it always tends to oscillate out of phase with the flapper beam. The ideal realization of this scheme would result in the summation of all forces in the system being zero. As it turns out, departures from the ideal result in very small residual energies which can be rapidly dissipated as heat.

Before proceeding with a description of the embodiment of the invention, it should be revealed that two distinct oscillating domains have been observed. This means that oscillations may occur over a range of spring rates, or over a range of proportional band settings (their analog). The first domain is characterized by higher frequencies and lower amplitudes than the second domain. It can be speculated that the oscillating energy is approximately the same in each domain, that the frequencies are harmonics of each other, that they are likely to be octaves, and that the oscillations tend to "lock-in" on a discrete median frequency in each domain. However, it is the purpose of the invention to eliminate an unacceptable phenomenon, not to extend the frontiers of theoretical knowledge, so research in pursuit of the next refined decimal place remains for future investigation.

Compensation, or oscillation dampening, for the flapper-beam is embodied in what may be described as a pivoted, elongated member, or beam. This compensation beam is mounted at a pivot on the flapper-beam and responds to the initiated harmonic frequency of the flapper-beam in performance of its dampening function. The compensation beam is pivoted at its center of gravity and has no spring attached to it, nor is it coupled to the pilot valve. Thus, the compensation beam is not influenced by the direction or magnitude of gravitational fields, accelerated motions in any combination, mechanical shocks, or vibrations from external sources.

In principle, the compensation beam responds only to motions of the flapper-beam and, to the extent that it retards accelerated (oscillating) motions of the flapper-beam toward the pilot valve (the source of sustaining energy), the compensation beam inhibits the addition of driving energy to the oscillating system and performs this function only when oscillations are occuring, or attempting to occur.

Further, the compensation beam being mounted with neutral equilibrium on the flapper-beam, and having a low mass moment of inertia comparable to that of the flapper-beam, it offers entirely negligible resistance to normal motions of the flapper-beam in response of the latter to movement of the primary element. The resistance to motion offered by the compensation beam is partially inertial and partially frictional. These resistances are reactions; they are always opposed to forces imparted to the compensation beam from the flapper-beam; the reactions increase as the imparted forces increase, and they approach zero as the angular velocity of the compensation beam approaches the angular velocity of the flapper-beam. It will be recognized that such an arrangement will produce a time-delay, but it will not introduce hysteresis. The range of movement of the primary element is so small that the time delay approaches zero.

FIG. 1—The Overall Embodiment of the System

FIG. 1 is a somewhat diagrammatic representation of the basic elements of force-balance systems in which the present invention is embodied. The centerpiece of this system is beam 1. This is the flapper-beam of the foregoing Terms and Technology. As an elongated beam member, beam 1 is fulcrumed at 2. It matters little whether this is referred to as a pivot, or fulcrum. The forces applied to the beam are directed either clockwise, or counter-clockwise around the fulcrum. If the forces applied throw the flapper-beam into the instability of oscillation, the embodied invention is brought into the combination to obviate the conditions that brought on the instability.

The first force considered as applied to the flapper-beam 1 is that generated by Bourdon tube 3. The Bourdon tube is a well-known device for receiving a variable pressure to be measured, manifested, or utilized in control of a variable condition relating to the pressure applied to the tube. As the pressure applied to the tube 3 increases, the tube tends to straighten out with the result that its end 4 moves over a distance whose increments are representative of the increments of pressure applied to the tube. The movement of end 4 is applied to the end 5 of a leaf spring 6 which is mounted on the end 7 of flapper-beam 1.

The effective length of spring 6 between the tube end 4 and end 7 of flapper-beam 1 is determined by the movable attachment 8. It can be readily ascertained from the structural arrangement of FIG. 1 that attachment 8 can be moved left or right to determine the effective length of spring 6 connecting the tube 3 and flapper-beam 1. The force exerted counter-clockwise upon flapper-beam 1, about fulcrum 2, is opposed by a continuous spring force. This continuous spring force could be disclosed as within pilot valve 9. The force exerted by the pilot valve 9 may be fluid pressure, rather than spring force. This spring 10, whether in or out of valve 9, acts upward against flapper-beam 1, or as more precisely described, clockwise about fulcrum 2. Also, the fluid pressure within valve 9, by means of the stem, could be directed upward against flapper beam 1. The result is that for every position taken by the end 4 of tube 3, there is a position taken by the stem of pilot valve 9. The result, by now obvious, is that for every pressure applied to Bourdon tube 3, as a primary element, there is a predetermined value of fluid pressure output from pilot valve 9. This pilot valve output can then be relayed, magnified, characterized, and used for any manifesting or control function demanded by the condition to which tube 3 is responsive.

The problem solved by the present invention centers around the connection of leaf spring 6 which attaches flapper-beam 1 to the primary element 3. The position of attachment 8 determines what is called the proportional band. The proportional band is no more than a setting of the mechanical advantage given the tube end 4 in applying its force to flapper-beam 1. If attachment 8 is positioned to the left, as viewed in FIG. 2, the end 7 of flapper-beam 1 is forced to follow more closely the movement of tube end 4. This is usually described as the narrow portion of the proportional band, and is designated by small percentage numbers. The connotation of the designations is that the positional range of the tube end 4 results in the fluid pressure output of pilot valve 9 being over its full range. Commonly, the fluid pressure output of this pilot valve range is 3–15 psi.

Figure 3:
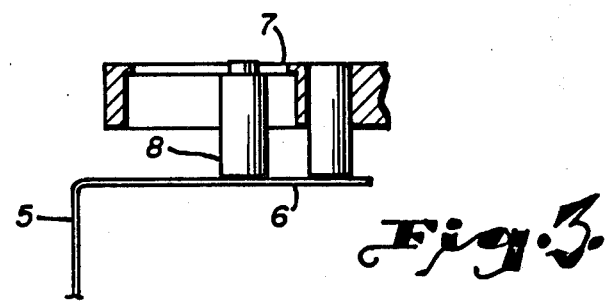
FIG. 3 is an elevation of the proportional band adjustment of FIG. 1 set at a high proportional band.

Now, consider the attachment 8 as being positioned to the right, as in FIG. 3. The effective length of leaf spring 6, between flapper-beam 1 and Bourdon tube 3, approaches its maximum. Larger percentages of the positional range of tube end 4 will be required to develop the 3–15 psi fluid pressure output range of pilot valve 9. This setting can be referred to as the wide proportional band adjustment. If stated in terms of percentages, the proportional band could be defined as larger percentages.

The Compensation Beam

Figure 4:
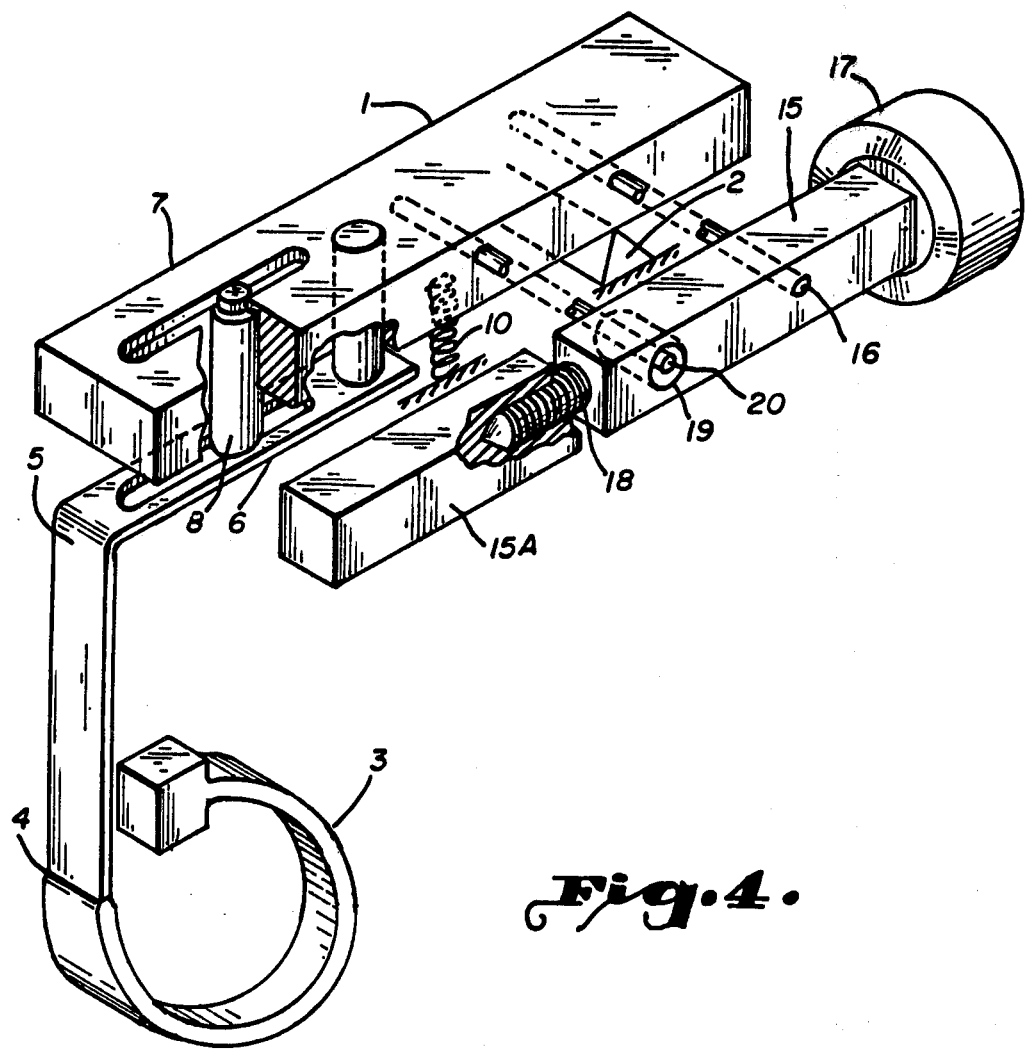
FIG. 4 is an exploded isometric of the structure of FIG. 1.

Both FIGS. 1 and 4 should be referred to in garnering complete disclosure of the essential element of the invention. Oscillations induced into the flapper-beam 1 are eliminated by compensation beam 15, including a portion 15a. This beam 15 is pivoted at 16 on flapper-beam 1. Beam 15 is balanced across pivot 16 by moving weight 17 on the threaded righthand end of beam 15. That portion of beam 15 to the left of pivot 16 is considered in two parts. These two parts are joined by threaded engagement at 18, the outer end portion 15a rather loosely threaded to the main body of beam 15 so that 15a will readily rotate in its threaded engagement, and is to be understood as a component of compensation beam 15.

The cross-section of 15a is square, or rectangular. As it rotates in its threaded engagement with the main portion of beam 15, the edge of its cross-section will engage the side of beam 1. In the main portion of beam 15, a hole 19 is provided into which pin 20 extends from flapper-beam 1. Rotation of beam 15 about pivot 16 will engage the upper or lower side of hole 19 by pin 20.

Operation

The function of the compensation beam 15 should be considered in two parts. Both of these functions are related to the frequencies of the oscillations of flapper-beam 1 which will be designated as high or low in frequency.

Given the structure and arrangement of beam 15 as it is carried by pivot 16, and its engagement with flapper-beam 1 through the edges of rotating 15a, at a point spaced from pivot 16, and engagement of pin 19 with the sides of hole 20, the energy of oscillation in flapper-beam 1 will be absorbed by compensation beam 15. First, high frequency vibrations, or oscillations, of flapper-beam 1 will be transmitted to compensation beam 15 through pivot 16. These high frequency vibrations imparted to 15a will cause it to rotate in its threaded engagement with the main body of compensation beam 15. Rotation of 15a will occur because the extended axis of rotation does not pass through the center-of-mass of 15a. Rotation, of course, will bring a corner edge of 15a into engagement with the side of flapper-beam 1 at a point spaced from pivot 16. The inertia of the compensation beam 15 will cause it to behave very much like a fixed member relative to the flapper-beam 1 and energy from the flapper-beam 1 will be absorbed by the compensation beam 15 with the resulting dampening of vibration in exactly the same manner as if flapper-beam 1 was, in fact, dragging against a fixed member. This dampening mechanism is so efficient that the dampening action appears, subjectively, to be instantaneous.

Low frequency vibrations of flapper-beam 1 will be transmitted to compensation beam 15 through contact with the sides of hole 19 by pin 20. This contact between pin and hole will transmit the energy of low frequency vibrations of beam 1 to compensation beam 15 and result in dampening the vibrations of beam 1. As the flapper-beam 1 moves upward in clockwise rotation, the pin 20 strikes the top of hole 19, accelerating the compensation beam 15 to rotate clockwise and decelerating flapper-beam 1. When the flapper-beam 1 starts its return, counter-clockwise portion of the vibration cycle, pin 20 strikes the bottom of hole 19, decelerating compensation beam 15 from its clockwise rotation and decelerating the flapper-beam 1 from its already-begun counter-clockwise rotation. Thus the flapper-beam 1 and the compensation beam 15 oscillate out of phase with each other, and this phase relationship is maintained as long as there is excess energy in the system. In actual reductions to practice of this system, vibrations have ceased after a very few cycles, i.e., less than ten cycles.

Conclusion

Figure 2:
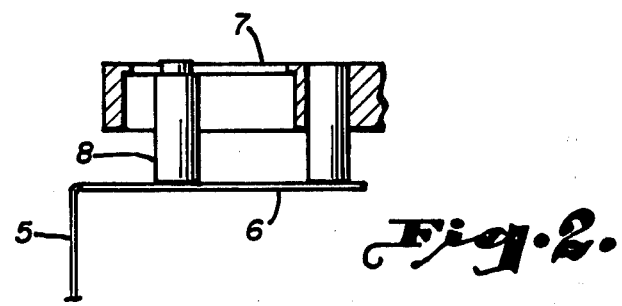
FIG. 2 is an elevation of the proportional band adjustment of FIG. 1 set at a low proportional band.

The restrictions of the view presented by FIG. 1 demanded the exploded isometric of FIG. 4. As the compensation beam 15 is close to the same physical size as force-balance beam 1, FIG. 1 did not make it clear just how the two beams related to each other. FIGS. 2 and 3 may not be necessary, but they do clearly show the extremes of adjustment in the proportional band arrangement forming the connection between the Bourdon tube and the end of the fulcrumed beam. After all, it is the characteristics of the leaf spring of the connection which originated the problem solved by the invention.

From one viewpoint, the concept of the invention is to mount an energy-absorbing structure on the fulcrumed beam which is activated when pulsations/oscillations begin. The connection between the compensation beam and its host beam is actuated by both low frequency and high frequency oscillations/pulsations.

From a second viewpoint, the two beams may be considered as a single, but composite, structure. The overall reaction of the combination is to preclude the formation of pulsations/oscillations as the combination strains in its spring-tether to the primary element.

Finally, many different explanations could be formed of the source of pulsations/oscillations in the system. Also, the response of the compensation beam in its absorption of energy could be analyzed ad infinitum. The simple truth is that the structure, as disclosed, performs satisfactorily in its actual reduction to practice and little is left except to define the invention clearly in the claims of this application.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. A force-balance system responsive to a variable to establish a fluid pressure output signal representative of the variable, including,
   a first elongated beam member,
   a fulcrum structure for the first beam member,
   a structure for exerting a first continuous force on the first beam member in the direction to rotate the beam clockwise about the fulcrum structure,
   a pilot valve connected to the first beam member with which to establish a fluid pressure output over a predetermined range,
   a primary element responsive to a variable condition by establishing a mechanical movement over a predetermined range,
   a variable length spring connected between the first beam member and primary element arranged to exert a force upon the first beam member counterclockwise about the fulcrum structure,
   a compensation beam with its pivot point mounted on the first beam member in an arrangement whereby the compensation beam responds to undesirable oscillations initiated in the first beam member,
   and means for connecting the compensation beam to the first beam member so that the response of the compensation beam absorbs the energy of the first beam member to dampen its oscillations.

2. The system of claim 1, wherein,
   the adjustable spring connecting the primary element to the first beam member is connected at various points along its length which predetermines the effective length of the spring which forms the connection between the primary element and the first beam member.

3. The system of claim 1, in which,
   the primary element is a Bourdon tube responsive to pressure and the end of the tube is connected to the first beam member of the force-balance system through the variable length of the spring.

4. The system of claim 1, wherein,
   the pilot valve connected to and actuated by the first beam member is supplied pressure fluid which is delivered to the output of the valve within a pressure range of 3–15 psi.

5. In a system for manifesting the mechanical positions of a primary element within a predetermined range wherein the system is characterized by a fulcrumed beam upon which the force-position of the primary element is applied to the beam in opposition to a continuous force to actuate a pilot valve whose output of fluid pressure represents the position of the primary element, including,
   a leaf spring connected between the primary element and the beam with predetermined effective lengths of the spring,
   a compensation beam pivoted on the fulcrumed beam to respond to oscillations of the fulcrumed beam,
   and a connection between the fulcrumed beam and the compensation beam through which energy in the fulcrumed beam is transmitted to the compensation beam to terminate the oscillations.

6. The system of claim 5, wherein,
   the compensation beam is substantially balanced across its pivot and a section of the beam rotates freely under the force of relatively high frequency oscillations to make contact with the fulcrumed beam and absorb the energy of oscillation from the fulcrumed beam.

7. The system of claim 6, wherein,
   the pivoted compensation beam and the fulcrumed beam are connected by a pin mounted in the beam and a slightly larger hole in the pivoted beam,
   whereby the energy of relatively high frequency oscillations of the fulcrumed beam are absorbed by contact with the threaded portion of the pivoted beam and the relatively low frequency oscillations of the fulcrumed beam are absorbed through the pin contacting the sides of the slightly larger hole.

* * * * *